Dec. 20, 1960

D. L. MITCHELL 2,965,886

DEVICE FOR SETTING AND LOCKING MAGNETIC TRANSDUCER HEADS ASSOCIATED WITH A MAGNETIC DATA STORAGE DEVICE

Filed Sept. 29, 1958

Inventor
Darrell L. Mitchell

Sughrue and Rothwell Attys 2,965,886

DEVICE FOR SETTING AND LOCKING MAGNETIC TRANSDUCER HEADS ASSOCIATED WITH A MAGNETIC DATA STORAGE DEVICE

Darrell L. Mitchell, Charleston, N.H., assignor, by mesne assignments, to Ex-Cell-O Corporation, Detroit, Mich., a corporation of Michigan Filed Sept. 29, 1958, Ser. No. 764,092

6 Claims. (Cl. 340—174.1)

This invention relates to improvements in a device for setting and locking in a predetermined position the magnetic transducer heads which are associated with movable magnetic data storage devices.

Magnetic data storage devices of the movable type such as magnetic drums or discs are assuming an increasingly important role in the electronic computer and data handling arts. In the broadest sense, such devices include a movable record medium having a magnetizable surface and a plurality of magnetic transducer heads associated with the surface for reading or writing the intelligence on the magnetic record surface. Such transducer heads, as are well known in the art, may have two pole forming elements in the end thereof adjacent the recording surface to define a magnetic flux path. These magnetic pole elements are fixed close to each other to define a narrow spacing commonly oriented such that the magnetic flux path between the poles extends in a direction substantially transverse to the rotative axis of the storage device or record medium. A magnetic storage device assembly may include a large number of transducer heads which must be fixed with correct flux path orientation relative to the movement of the record medium.

It has been heretofore proposed to provide the magnetic transducer heads with a generally cylindrical body having a flat reference surface thereon, which reference surface is precisely oriented relative to the flux-gap defining pole pieces. Thus, by correctly aligning the flat reference surface the flux path of the transducer heads may be correctly aligned. Further a locking washer may be positioned between two adjacent heads with the flat reference surfaces facing each other and this locking washer may then lock both of the heads in correctly aligned position. Such a device as described above is disclosed in the copending application of Hugh M. Taft, Serial No. 684,278, assigned to the assignee of this invention.

Although the locking clip utilized in the device disclosed in the Taft application is sufficient for its intended purpose, the clip, when engaged, may bite into the relatively soft metal from which the transducer head casings are formed, thus marring and scarring the heads and possibly causing the reference surface to be displaced. Accordingly, it is the principal object of this invention to eliminate some of the problems involved with prior known magnetic head holding and locking devices and, further, to provide a locking device cooperating with flat reference surfaces of magnetic heads which will not mar or otherwise deform these surfaces when the locking device is holding the heads in position.

Not only is it desirable to position that the flat reference surfaces of adjacent heads are parallel to each other, but these reference surfaces should also be perpendicular to a line connecting the centers of the adjacent heads. This is necessary in order to assure that the flux gap defining pole pieces of the heads assume the correct relationship with respect to each other as well as with respect to the associated recording tracks. Accordingly, it is an additional object of this invention to provide a locking clip and alignment stabilizer for adjacent magnetic transducer heads associated with a magnetic data storage device in which the reference surfaces of the heads are stabilized such that they are not only parallel to each other but are normal to a line connecting the centers of the heads.

Further objects and advantages of this invention will be apparent from the following detailed descriptions taken in connection with the accompanying drawings wherein the principles of this invention and the best mode known for applying this principle is disclosed.

Figure 1:
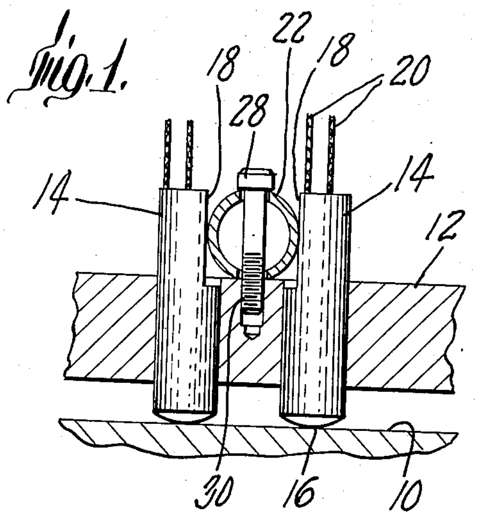
Fig. 1 is a partial sectional view of a portion of a magnetic storage device and housing therefor showing a pair of magneitc transducer heads locked by the locking device of this invention.
Figure 2:
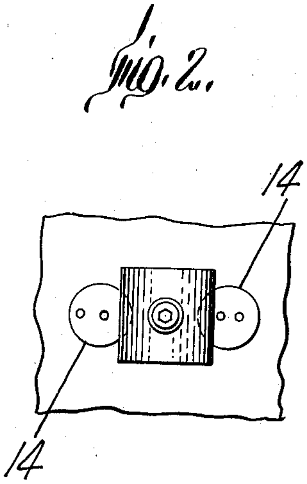
Fig. 2 is a top plan view of a portion of a magnetic storage device housing showing the locking device of Fig. 1.

Referring to the drawings, in Fig. 1 reference numeral 10 indicates a movable magnetic data record having a magnetizable surface such as well known in the art. Associated with the magnetic record is a housing or support 12 for supporting a plurality of magnetic transducer heads 14. As shown in Fig. 2, the transducer heads are substantially cylindrical in cross section. At the ends of the head adjacent the recording surface 10 are pole pieces 16 forming a flux-defining gap. As shown in Fig. 1, the cylindrical body of each transducer head 14 has an upper flat portion 18 which serves as a reference surface to orient the flux gap of the pole pieces 16 correctly with regard to the movement of the recording surface 10. Suitable electrical leads 20 may be provided for each of the magnetic transducer heads 14. Magnetic transducer heads having flat reference surfaces for orienting the pole pieces thereof are disclosed in the aforesaid Taft application and reference may be had thereto for a disclosure of the other components of the magnetic data storage device which are not part of this invention.

Figures 3, 4, 5:
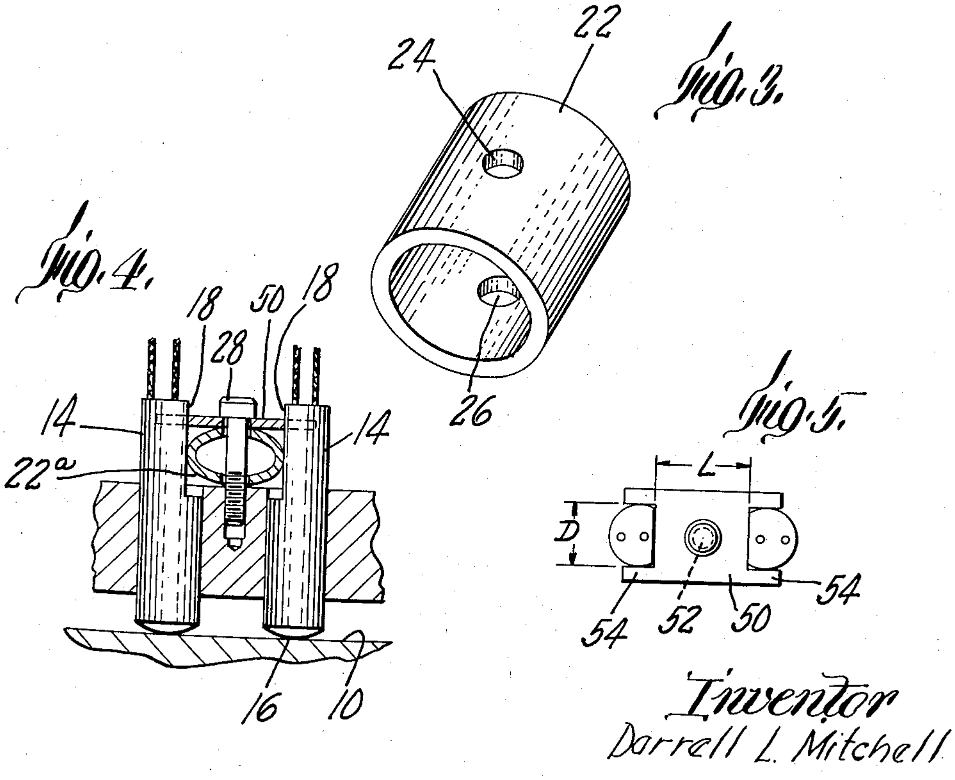
Fig. 3 is a perspective view of the short tubular locking device per se.
Fig. 4 is a partial sectional view of a portion of a magnetic data storage device and housing therefor showing a modified form of a locking clip together with a stabilizing member for locking and stabilizing adjacent transducer heads.
Fig. 5 is a top plan view of the stabilizer member shown in Fig. 4 associated with adjacent heads.

The improved transducer head locking and holding device which is the subject of this invention includes a short tubular clip 22 made of any suitable spring material such as steel, Phosphor bronze, beryllium copper, or the like. As shown in Fig. 3, the clip 22 has a pair of aligned holes 24 and 26 substatially transverse to its longitudinal axis. The clip, which is a slip fit between adjacent flat reference surfaces 18—18, may be inserted between adjacent transducers 14—14 and a suitable cap screw or the like 28 is passed through the aligned holes 24 and 26 and threaded into threaded hole 30 in support 12. When the screw is tightened past its snug position the tubular clip 22 compresses and bulges outwardly to exert a force against the flat reference surfaces 18—18. The compressed clip also acts as a head-locking device for the head of the cap screw 28 and prevents this screw from working loose.

The clip when inserted between adjacent transducers 14—14 will act to align the transducer head flats 18—18 and orient the pole pieces 16—16 in the required manner. It can also be seen that the clip will, by engaging the flats 18 with the sides of a tubular member, not mar the transducer casings or deform them while rigidly clamping and holding them in the oriented position. The clip 22 in its compressed and locking condition is independent of any other part of the magnetic data storage device housing and therefore any desired heads 14 may be removed therefrom by removing the clip associated therewith.

It is also desirable to align the flat reference surfaces 18 of the transducer heads 14 such that they are not only parallel to each other but also perpendicular to a line connecting the center of the heads. With this relationship the pole pieces 16 will be correctly oriented as well as parallel to each other. The modification shown in Figs. 4 and 5 relates to a construction for this result. A tubular locking clip $22_a$, which is similar to locking clip 22, is compressed by a cap screw 28 passing therethrough in a manner similar to that described above. The stabilizing function is accomplished by a stabilizing member 50 having a center hole 52 which is slightly larger than the body of screw 28. The stabilizer, as shown in Fig. 5, is formed with notches 54 in its ends. The bottom portions of the notches are parallel to each other and located at a distance "L" which is substantially equal to the distance between the flats 18—18 of adjacent heads 14—14. The width "D" of the slot 54 is substantially equal to the diameter of the adjacent heads 14—14. With this construction of the stabilizer member 50, the adjacent heads 14—14 can only be assembled such that the adjacent flats 18—18 will be parallel to each and will be perpendicular to a line connecting the centers of adjacent heads.

While there have been shown and described and pointed out fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a magnetic data storage device having a movable magnetizable recording surface and a plurality of magnetic transducer heads adapted to be positioned adjacent thereto, an improved head setting and locking device comprising; a tubular locking clip constructed of spring material, said clip being positioned between adjacent transducers, and fastening means exerting a force on the locking clip substantially transverse to its longitudinal axis thereby tending to flatten the tubular locking spring clip and exert a locking and holding force on the adjacent magnetic transducer heads contacted by the compressed clip.

2. In a magnetic data storage device having a movable magnetizable record surace and a plurality of signal transmitting transducer heads adapted to be oriented in the proximity of the recording surface and having a flat reference surface thereon, an improved transducer head locking device for locking a pair of adjacent transducers with the flat surfaces thereof adjacent each other, said locking device comprising; a tubular locking clip, means defining aligned holes in said tubular clip substantially transverse to the longitudinal axis thereof, and a fastening screw extending through said aligned holes and threaded into a head support for compressing said clip and exerting a locking and holding force on the facing reference flats of the adjacent magnetic transducer heads.

3. A device as defined in claim 2 wherein said screw means include a cap screw, the head of which is locked when said tubular clip is compressed.

4. In a magnetic data storage device of the type having a magnetizable record surface, a housing adjacent said record surface, and a plurality of elongated signal transmitting transducer heads mounted in the housing with one end thereof adjacent the periphery of the recording surface, each of the heads having magnetic flux transmitting poles and a peripheral configuration of non-uniformity in established relationship to the poles, an improved setting and locking device for a pair of adjacent heads, said locking device comprising; a tubular clip, said clip positioned between two adjacent heads and contacting the non-uniform peripheral configurations thereof, means defining a pair of aligned holes in the clip substantially transverse to the longitudinal axis thereof, and screw means extending through said holes and adapted to compress said tubular clip substantially transverse the longitudinal axis thereof to bind and hold and lock the adjacent transducer heads contacted by the clip.

5. In a magnetic data storage device having a movable magnetizable record medium and a plurality of magnetic transducer heads associated therewith, said transducer heads adapted to be oriented by means of a flat surface thereon, an improved head stabilizing and locking device comprising; a generally tubular locking member positioned between adjacent transducers with the axis thereof parallel to the flat reference surface of said transducers, a stabilizer member positioned adjacent said locking strip and adapted to contact the adjacent transducers to assure that the flat reference surfaces thereof will be normal to an imaginary line connecting the centers of adjacent transducer heads, and a fastening device extending through said stabilizer and said locking clip and adapted to exert a compressive force on said locking clip to force the sides thereof against the sides of said flat reference surfaces of said heads to thereby lock said heads in aligned position.

6. A device as defined in claim 5 wherein said stabilizer member is an elongated strip having notches in opposite ends thereof, said notches being generally U shaped and having parallel bottoms spaced apart a distance equal to the distance between the flat surfaces of adjacent transducers, and said notches having width equal to the width of the transducer heads.

References Cited in the file of this patent

UNITED STATES PATENTS

| | | |
|---|---|---|
| 2,700,588 | Williams et al. | Jan. 25, 1955 |
| 2,708,693 | Hendrickson | May 17, 1955 |
| 2,713,386 | Holtz | July 19, 1955 |
| 2,862,067 | Christoff | Nov. 25, 1958 |
| 2,864,892 | Perkins | Dec. 16, 1958 |